(12) United States Patent
Akiyama et al.

(10) Patent No.: US 7,858,670 B2
(45) Date of Patent: Dec. 28, 2010

(54) PHOTOSENSITIVE INKJET INK

(75) Inventors: Ryozo Akiyama, Mishima (JP); Hiroshi Kiyomoto, Hiratsuka (JP); Yukiko Kawakami, Mishima (JP); Kazuhiko Ohtsu, Mishima (JP); Toru Ushirogouchi, Yokohama (JP); Mitsuru Ishibashi, Yokohama (JP)

(73) Assignees: Toshiba Tec Kabushiki Kaisha, Tokyo (JP); Kabushiki Kaisha Toshiba, Tokyo (JP)

( * ) Notice: Subject to any disclaimer, the term of this patent is extended or adjusted under 35 U.S.C. 154(b) by 416 days.

(21) Appl. No.: 11/672,788

(22) Filed: Feb. 8, 2007

(65) Prior Publication Data

US 2007/0185224 A1 Aug. 9, 2007

(30) Foreign Application Priority Data

Feb. 8, 2006 (JP) ............................. 2006-031454

(51) Int. Cl.
- *C09D 11/00* (2006.01)
- *C09D 11/10* (2006.01)
- *C08G 65/02* (2006.01)
- *C08G 65/26* (2006.01)

(52) U.S. Cl. .......................... 522/83; 522/168; 522/75; 523/160; 528/406; 528/417

(58) Field of Classification Search .................. 522/31, 522/168, 181, 83, 170; 528/405, 417, 406; 427/466; 523/160
See application file for complete search history.

(56) References Cited

U.S. PATENT DOCUMENTS

| | | | |
|---|---|---|---|
| 6,866,376 B2 * | 3/2005 | Maeda et al. ................ 347/100 |
| 6,959,986 B2 | 11/2005 | Ushirogouchi et al. |
| 7,056,559 B2 * | 6/2006 | Nakajima et al. ........... 427/466 |
| 7,125,112 B2 | 10/2006 | Ushirogouchi et al. |
| 7,244,773 B2 * | 7/2007 | Sasa ........................... 522/168 |
| 7,375,145 B2 * | 5/2008 | Akiyama et al. ............ 522/168 |
| 7,473,720 B2 * | 1/2009 | Akiyama et al. ............ 522/168 |
| 2004/0050292 A1 | 3/2004 | Nakajima et al. |
| 2004/0167315 A1 * | 8/2004 | Sasa ........................... 528/406 |
| 2005/0113476 A1 * | 5/2005 | Akiyama et al. ................ 522/1 |
| 2006/0019077 A1 * | 1/2006 | Hopper et al. .............. 428/209 |
| 2007/0101898 A1 * | 5/2007 | Akiyama et al. ........... 106/31.6 |
| 2007/0202437 A1 * | 8/2007 | Ishibashi et al. ......... 430/270.1 |

FOREIGN PATENT DOCUMENTS

| | | |
|---|---|---|
| EP | 1 528 088 A1 | 5/2005 |
| EP | 1 528 089 A2 | 5/2005 |
| EP | 1 668 468 A1 | 8/2006 |
| EP | 1 696 007 A1 | 8/2006 |
| EP | 1 696 008 A1 | 8/2006 |
| EP | 1 705 230 A1 | 9/2006 |
| JP | 2-47510 | 2/1990 |
| JP | 8-62841 | 3/1996 |
| JP | 8-143806 | 6/1996 |
| JP | 9-183928 | 7/1997 |
| JP | 10-250052 | 9/1998 |
| JP | 2000-44857 | 2/2000 |
| JP | 2001-181385 | 7/2001 |
| JP | 2001-220526 | 8/2001 |
| JP | 2001-272529 | 10/2001 |
| JP | 2002-188025 | 7/2002 |
| JP | 2002-317139 | 10/2002 |
| JP | 2004-323610 | 11/2004 |

\* cited by examiner

*Primary Examiner*—Susan W Berman
(74) *Attorney, Agent, or Firm*—Oblon, Spivak, McClelland, Maier & Neustadt, L.L.P.

(57) ABSTRACT

A photosensitive inkjet ink is provided, which includes a photo-acid generating agent, pigment, and an organic dispersion medium containing at least two kinds of polymerizable compounds selected from the group consisting of an oxetane compound and a vinyl ether compound, at least one kind of the polymerizable compounds being a monofunctional compound at a concentration of 20 to 70% based on a total weight of the organic dispersion medium, and the vinyl ether compound at a concentration of 30% or more based on a total weight of the organic dispersion medium. The vinyl ether compound is selected from the following chemical formula.

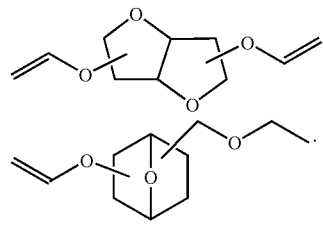

10 Claims, 1 Drawing Sheet

PRIOR ART
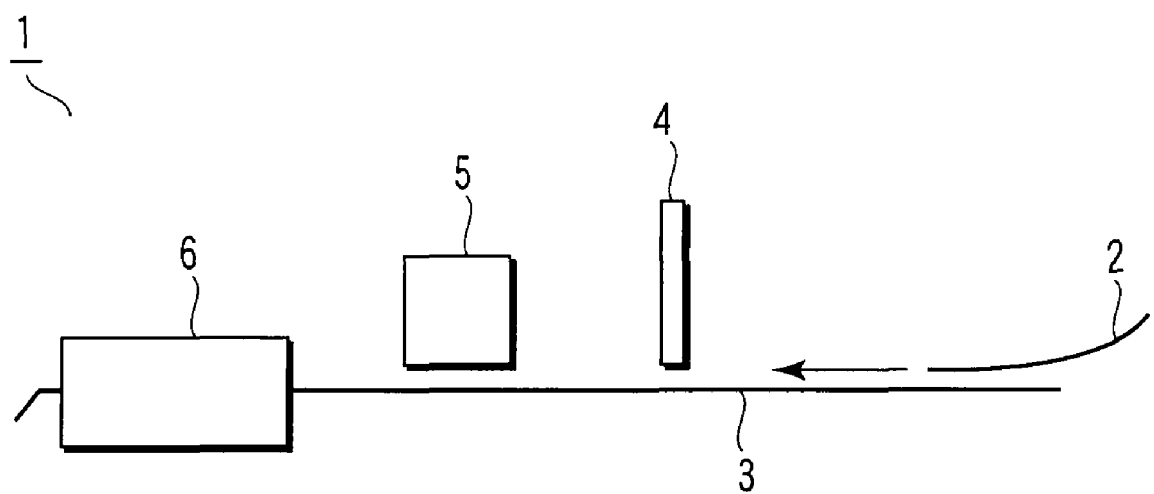

PHOTOSENSITIVE INKJET INK

CROSS-REFERENCE TO RELATED APPLICATIONS

This application is based upon and claims the benefit of priority from prior Japanese Patent Application No. 2006-031454, filed Feb. 8, 2006, the entire contents of which are incorporated herein by reference.

BACKGROUND OF THE INVENTION

1. Field of the Invention

This invention relates to a photosensitive inkjet ink.

2. Description of the Related Art

In the preparation of the ink for an inkjet printer, pigment is employed as a colorant in order to improve the qualities of printing such as water resistance and light-resistance. Because of the feasibility of high-speed curing, because of limited volatilization of organic solvent and because of excellent adhesion, an ultraviolet curing type ink (UV ink) is now attracting many attentions.

As specific examples of the UV ink, the compositions comprising a radical polymeric monomer, a photopolymerization initiator and a pigment have been typically employed. There has been also proposed to employ a photopolymerizable UV ink comprising a cationic polymeric monomer, a photocation-generating agent and a pigment. Since these UV inks are enabled to form an ink layer which can be quickly non-fluidized as it is irradiated with light, it is possible to obtain a printed matter which is excellent in safety and in quality.

With respect to the recording by inkjet system, there is an increasing demand to perform the printing not only to a paper or resin substrate but also to a metal substrate. According to the conventional inkjet inks however, it has been impossible to form an ink layer which is sufficiently high not only in adhesion to a metal substrate but also in solvent resistance. In recent years, there has been tried to manufacture electronic parts such as a circuit board by printing, in which case, a circuit is formed on a resin substrate using a conductive material. If there is an ink which is capable of forming an ink layer having an excellent adhesion to metal substrate and exhibiting a sufficient strength, it would be possible to laminate both of an insulating material layer and a conductive material layer by printing. However, no one has succeeded to obtain such an ink as yet.

In recent years, inkjet ink is required to be excellent in safety in addition to excellent adhesion. The cationic polymerizable ink mentioned above generally comprises an epoxy compound as a polymeric monomer. Many kinds of epoxy resin indicate positive in the AMES test (a reverse mutation test where bacterias are employed). Because of this, epoxy resin is not necessarily safe in viewpoint of mutagenesis, etc. Although there are some kinds of epoxy resin which indicates negative in the AMES test, such epoxy compounds are limited in kinds. Moreover, the ink containing such epoxy compounds is not satisfactory in adhesion and in curing properties.

An ink incorporated with an epoxy compound indicating negative in the AMES test is also proposed. When a large quantity of alicyclic epoxy compound is included in the ink, there is a problem that it is impossible to obtain a sufficient solvent resistance.

BRIEF SUMMARY OF THE INVENTION

A photosensitive inkjet ink according to one aspect of the present invention comprises a photo-acid generating agent; pigment; and an organic dispersion medium containing at least two kinds of polymerizable compounds selected from the group consisting of an oxetane compound and a vinyl ether compound represented by the following general formula (1), at least one kind of the polymerizable compounds being a monofunctional compound which is included at a concentration of 20 to 70% based on a total weight of the organic dispersion medium; and the vinyl ether compound being included at a concentration of 30% or more based on a total weight of the organic dispersion medium:

$$R^{11}\text{—}R^{12}\text{—}(R^{11})_p \qquad (1)$$

(in this general formula (1), $R^{11}$s are individually a group selected from the group consisting of a vinyl ether group, a vinyl ether skeleton-bearing group, an alkoxy group, a substituted hydroxyl group and hydroxyl group, at least one of $R^{11}$s being a vinyl ether group or a vinyl ether skeleton-bearing group; $R^{12}$ is a (p+1)-valent group having a substituted or unsubstituted cyclic skeleton or aliphatic skeleton; and p is a positive integer including zero).

A printed material according to one aspect of the present invention comprises a cured matter which is obtained from the curing of the aforementioned photosensitive inkjet ink.

BRIEF DESCRIPTION OF THE SEVERAL VIEWS OF THE DRAWING

The single Figure is a schematic diagram illustrating a typical inkjet recording apparatus for performing recording using an inkjet ink according to one embodiment of the invention.

DETAILED DESCRIPTION OF THE INVENTION

Next, various aspects of the present invention will be explained as follows.

A photosensitive inkjet ink according to one embodiment of the present invention comprises a specific kind of organic dispersion medium and a photo-acid generating agent. More specifically, the organic dispersion medium contains at least two kinds of polymerizable compounds selected from an oxetane compound and a specific structure of vinyl ether compound.

As the oxetane compound, it is possible to employ a compound having two oxetane rings or a compound having one oxetane ring. As specific examples of the compound having two oxetane rings, they include, for example, di[1-ethyl(3-oxetanyl)]methyl ether, 1,4-bis[1-ethyl-3-oxetanyl)methoxy]benzene, 1,3-bis[1-ethyl-3-oxetanyl)methoxy]benzene, 4,4'-bis[(3-ethyl-3-oxetanyl)methoxy]biphenyl, 1,4-bis{[(3-ethyl-3-oxetanyl)methoxy]methyl}benzene, bis[(1-ethyl-3-oxetanyl)methoxy]cyclohexane, and bis[(1-ethyl-3-oxetanyl)methoxy]norbonane. As specific examples of the compound having only one oxetane ring, they include, for example, 3-ethyl-3-(phenoxymethyl)oxetane, 3-ethyl-3-(2-ethylhexyloxymethyl)oxetane, 3-ethyl-3-hydroxymethyl oxetane, [(1-ethyl-3-oxetanyl)methoxy]cyclohexane, and oxetanyl silsesquioxane. Further, it is also possible to employ acrylic compound having, on its side chain, an oxetane group, and methacrylic compound having, on its side chain, an oxetane group. When these compounds are incorporated in the organic dispersion medium, the viscosity of the photosensitive compound can be prevented from being increased and at the same time, it is possible to expect almost the same curing rate-accelerating effect as that of oxetane compound.

In order to enhance the adhesion of the photosensitive inkjet ink to a substrate formed of various metals such as SUS, copper and aluminum, plastic materials such as PET (polyethylene terephthalate), PP (polypropylene) and PC (polycarbonate), or glass, it is preferable to employ 3-ethyl-3-(phenoxymethyl)oxetane.

The employment of a bifunctional oxetane compound is useful for providing a photosensitive inkjet ink which is further improved in solvent resistance of printed matters. This oxetane compound may be used singly or in combination of two or more kinds.

On the other hand, as the vinyl ether compound, it is possible to employ vinyl ether compounds represented by the following general formula (1):

$$R^{11}-R^{12}-(R^{11})_p \quad (1)$$

(in this general formula (1), $R^{11}$s are individually a group selected from the group consisting of a vinyl ether group, a vinyl ether skeleton-bearing group, an alkoxy group, a substituted hydroxyl group and hydroxyl group, at least one of $R^{11}$s being a vinyl ether group or a vinyl ether skeleton-bearing group; $R^{12}$ is a (p+1)-valent group having a substituted or unsubstituted cyclic skeleton or aliphatic skeleton; and p is a positive integer including zero).

When p is zero and a cyclohexane ring skeleton is to be introduced as $R^{12}$ into the vinyl ether compounds, $R^{12}$ should preferably be selected so as to contain oxygen atom in view of the volatility of the photosensitive inkjet ink. More specifically, it is preferable that the $R^{12}$ is constituted by a structure wherein at least one of carbon atoms constituting the ring structure is arranged to form a ketone structure, by a structure having oxygen atom as a substituent group, or by a structure having an oxygen-containing substituent group.

As for the number of vinyl ether group to introduced into $R^{11}$s, it is preferable as many as possible in viewpoint of curing properties but there is not any particular limitation with regard to the number of vinyl ether group. However, when the viscosity of ink and the solubility of the photo-acid generating agent are taken into consideration, the number of vinyl ether group should preferably be 2, 3 or so at most.

As examples of the (p+1)-valent organic group $R^{12}$ in the general formula (1), they include a (p+1)-valent organic group derived from an aliphatic skeleton and a (p+1)-valent group containing an aromatic group. As specific examples of the aliphatic skeleton, they include, for example, an alkylene glycol skeleton such as a diethylene glycol skeleton and a triethylene glycol skeleton in addition to ethane skeleton and a butane skeleton. Further, as specific examples of the aromatic ring, they include, for example, benzene ring, naphthalene ring and biphenyl ring. At least one of the hydrogen atom of the aforementioned aliphatic skeleton and aromatic ring may be substituted by a substituent group such as methoxy group, methoxyethoxy group, alkoxy group, ether or ester such as acetoxy group and alkyl ester group.

Alternatively, a (p+1)-valent group which can be derived from an alicyclic skeleton may be introduced as the $R^{12}$. As for specific examples of the alicyclic skeleton, they include a cycloalkane skeleton, a norbornane skeleton, an adamantane skeleton, tricyclodecane skeleton, tetracyclododecane skeleton, terpenoid skeleton and cholesterol skeleton. An alicyclic skeleton having a bridged structure is effective in enhancing the hardness of cured material and hence the employment thereof is preferable. Further, in viewpoint of volatility, the inclusion of oxygen in an alicyclic skeleton is preferable. Specific examples of such an oxygen-containing alicyclic skeleton are a structure wherein some of carbon atoms constituting the cyclic skeleton are formed into a ketone structure, a structure wherein part thereof is substituted by oxygen atom and a structure having an oxygen-containing substituent group.

The viscosity of the compounds represented by the aforementioned general formula (1) may be generally confined to range from about 1 to 30 mPa·s. Therefore, when these vinyl ether compounds are employed, it is possible to secure not only the low viscosity but also solubility, which the photosensitive inkjet ink is demanded to have. Further, a great many of these vinyl ether compounds are very high in safety and indicate negative in toxicity in terms of skin stimulus and mutagenesis.

Followings are specific examples of the compounds represented by the aforementioned general formula (1) wherein a (p+1)-valent group having an aliphatic skeleton is introduced into the $R^{12}$. Namely, they include triethylene glycol divinyl ether (Rapi-CureDVE3: ISP Co., Ltd.), diethylene glycol divinyl ether (Rapi-CureDVE2: ISP Co., Ltd.), dodecyl vinyl ether (Rapi-CureDDVE: ISP Co., Ltd.), 4-hydroxybutyl vinyl ether (Rapi-CureHBVE: ISP Co., Ltd.), butanediol-1,4-divinyl ether (Rapi-CureDVB1D: ISP Co., Ltd.), tripropylene glycol divinyl ether (Rapi-CureDPE3: ISP Co., Ltd.), dipropylene glycol divinyl ether (Rapi-CureDPE2: ISP Co., Ltd.), hexanediol divinyl ether (Rapi-CureHDDVE: ISP Co., Ltd.), 2-hydroxyethyl vinyl ether (HEVE: Maruzen Petrochemicals Co., Ltd.), and diethylene glycol monovinyl ether (DEGV: Maruzen Petrochemicals Co., Ltd.).

Followings are specific examples of the vinyl ether compounds represented by the aforementioned general formula (1) wherein the $R^{12}$ is constituted by a (p+1)-valent group having a substituted or unsubstituted cyclic skeleton. Namely, they include compounds wherein hydroxyl group of the following alcohol compounds is substituted by vinyl ether or propenyl ether. Such alcohol compounds include cumene alcohol, vinyloxy benzene, hydroquinone, 1-carbomethoxy-4-vinyloxy benzene, 2-hydroxy naphthalene, 1-tert-butyl-4-vinyloxy benzene, bisphenol A, 1-octyl-4-vinyloxy benzene, 1-hydroxy-3,5-dimethyl benzene, 4-hydroxy cumyl phenol, and 3-isopropyl phenol.

Following chemical formulas as indicated by Aro. 1 to Aro. 11 represent specific examples of such vinyl ether compounds.

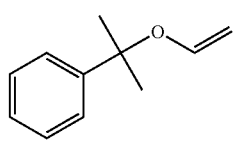

Aro. 1

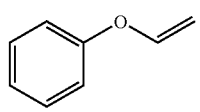

Aro. 2

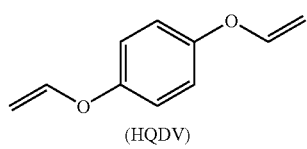

Aro. 3

(HQDV)

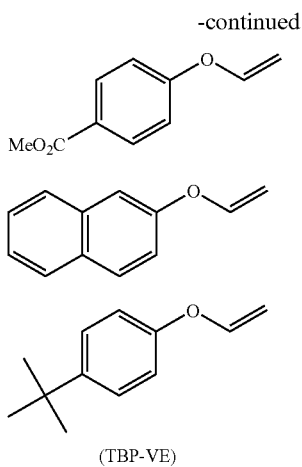

(TBP-VE)

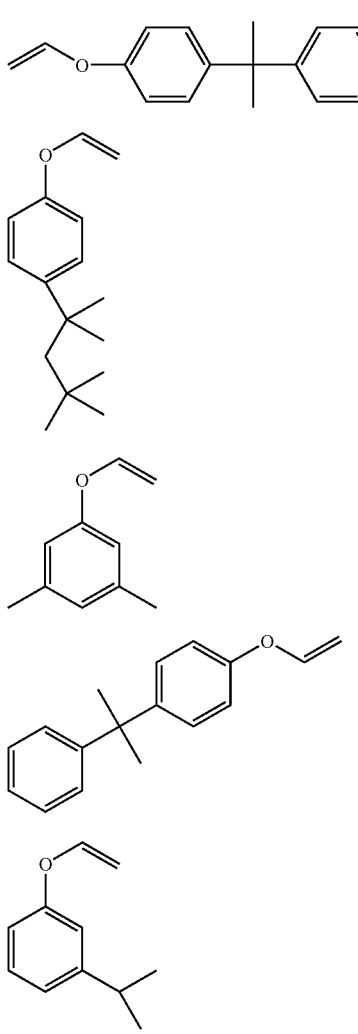

The cyclic compounds constituted by an alicyclic skeleton are more preferable than aromatic vinyl ether in terms of odor and safety. As for specific examples of the vinyl ether compounds having such an allcyclic skeleton, they should preferably be selected from those wherein the alicyclic skeleton comprises either a monocyclic structure constituted by a four- to six-membered cyclic skeleton or a bridged structure wherein such cyclic skeletons are linked to each other. More specifically, such vinyl ether compounds include, for example, those which can be derived from the following alicyclic alcohol compounds whose hydroxyl group is substituted by vinyl ether or propenyl ether. As for such alicyclic alcohol compounds, it is possible to employ, for example, cyclopentane mono(di)ol, cyclopentane mono(di)methanol, cyclohexane mono(di)ol, cyclohexane mono(di)methanol, norbornane mono(di)methanol, norbornane monool monomethanol, norbornane mono(di)methanol, tricyclodecane mono(di)ol, tricyclodecane mono(di)methanol and adamantane mono(di)ol.

More specifically, these alicyclic skeletons can be represented by the following general formula (VE1-a) or (VE1-b).

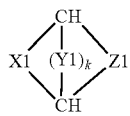

(VE1-a)

(VE1-b)

(wherein X1 and Z1 represent respectively alkylene group having 1 to 5 of carbon atoms; Y1 represents alkylene group having 1 or 2 in the number of carbon atoms; and k is 0 or 1)

As for specific examples of the vinyl ether compound having the aforementioned alicyclic skeletons, they include, for example, those which can be derived from the following alcohol compounds wherein the hydroxyl group thereof is substituted by vinyl ether or propenyl ether. As for such alcohol compounds, it is possible to employ, for example, 4-cyclohexane diol, dicyclopentadiene methanol, isoborneol, 1-tert-butyl-4-vinyloxy cyclohexanol, trimethyl cyclohexanol, dihydroxy octahydroxy phenyl, hydroxyl tricyclodecamonoene, menthol, 1,3-dihydroxy cyclohexane, decahydro-2-naphthalenol, vinyloxy cyclododecanol and norbornane diol.

Following chemical formulas as indicated by Ali. 1 to Ali. 14 represent specific examples of such vinyl ether compounds.

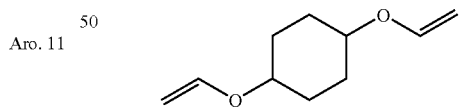

Ali. 1 (4CHDV)

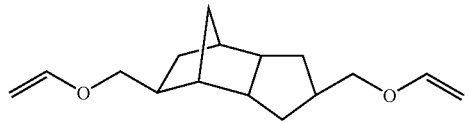

Ali. 2 (DCPVE)

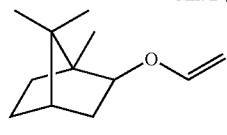

Ali. 3 (IBVE)

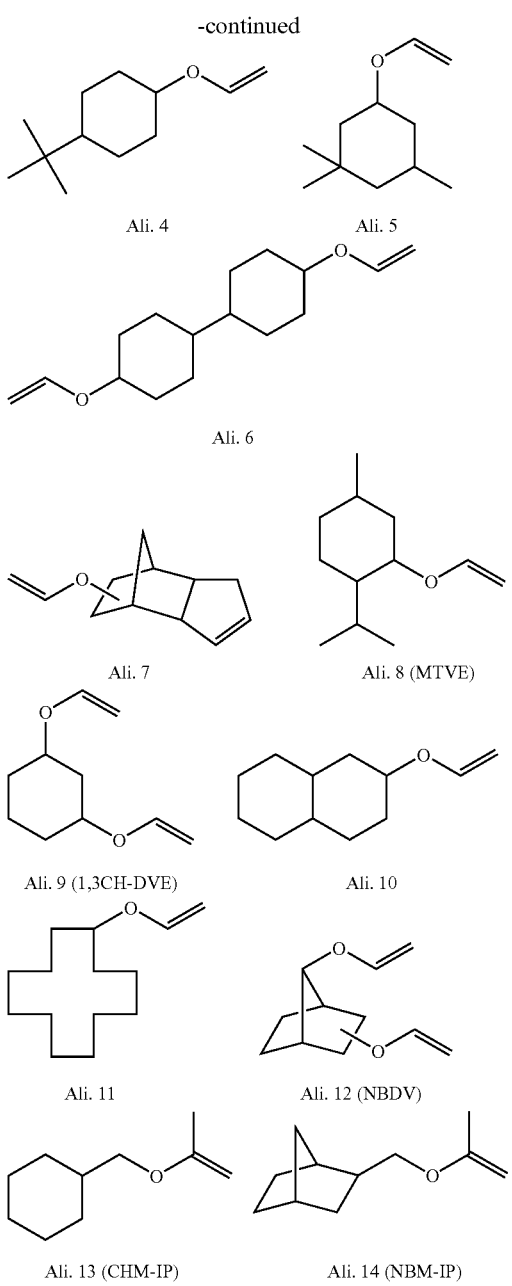

Among these compounds, the vinyl ether compounds which comprise an alicyclic skeleton having a bridged structure are more preferable in view of increasing the hardness of cured materials to be obtained. For example, it is possible to employ RAPI-CURE CHVE (cyclohexane dimethanol divinyl ether) and RAPI-CURE CHMVE (cyclohexane dimethanol monovinyl ether), both available from I.S.P. Japan Co., Ltd.

The compounds having an alicyclic skeleton and formed of an oxygen-containing structure are more preferable in terms of volatility and pigment dispersibility. As for specific examples of such an oxygen-containing structure, they include a structure wherein any of carbon atoms constituting the ring is substituted by oxygen atom. Alternatively, structures comprising an oxygen-containing substituent group such as methoxy group, methoxyethoxy group, alkoxy group or alkyl ester can be preferably employed.

As for the vinyl ether compounds having a ring structure containing an oxygen-containing substituent group, the following compounds can be employed. For example, they may be compounds that can be obtained by substituting a specific substituent group for hydroxyl group of alcohol compounds having an alicyclic skeleton comprising either a monocyclic structure constituted by a four- to six-membered cyclic skeleton or a bridged structure wherein such cyclic skeletons are linked to each other. For example, at least one hydroxyl group of the aforementioned alcohol compounds is substituted by a substituent group such as methoxy group, methoxyethoxy group, alkoxy group, ether or ester such as acetoxy group or alkyl ester group, and the rest of hydroxyl group(s) of the aforementioned alcohol compounds is substituted by a substituent group such as vinyl ether or propenyl ether. More specifically, such alcohol compounds include, for example, cyclopentane diol, cyclohexane di(tri)ol, cyclohexane di(tri) methanol, norbornane di(tri)ol, norbornane mono(di)ol mono (di)methanol, norbornane di(tri)methanol, tricyclodecane di(tri)ol, tricyclodecane di(tri)methanol, and adamantine di(tri)ol.

More specifically, vinyl ether compounds having an oxygen-containing substituent group and represented by the following chemical formulas are most preferable.

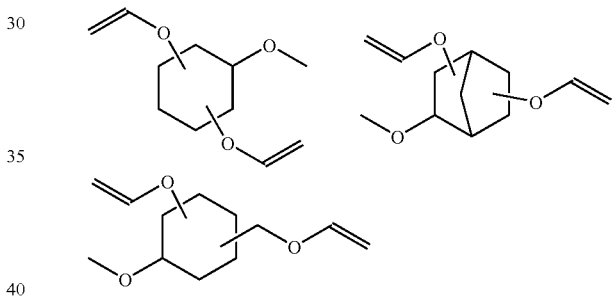

On the other hand, vinyl ether compounds having alicyclic skeleton containing oxygen atom are more preferable because of the properties thereof to further enhance the viscosity stability of ink. Specific examples of such vinyl ether compounds include the compounds represented by the following general formulas (VE2-a) and (VE2-b).

(wherein X2 and Z2 are respectively alkylene group having 1 to 5 carbon atoms or a bivalent organic group containing oxygen atom as ether linkage; Y2 is oxygen atom, alkylene group having 1 or 2 carbon atoms or a bivalent organic group containing oxygen atom as ether linkage; at least any one of X2, Y2 and Z2 contains at least one oxygen atom; and k is 0 or 1)

Due to the provision of the alicyclic skeleton, these compounds are excellent in safety and in curing properties. Moreover, the cyclic hydrocarbon skeleton having oxygen atom as a ring-constituting atom is enabled to exhibit a high surface tension. Because of this, the compounds satisfying the aforementioned conditions are enabled to exhibit high solubility and dispersibility.

The vinyl ether compounds having an alicyclic skeleton constructed as described above should preferably be selected from those having a cyclic ether skeleton constituted by a four- to six-membered cyclic skeleton. For example, such compounds include, for example, those which can be derived from the following alcohol compounds wherein the hydroxyl group thereof is substituted by vinyl ether or propenyl ether. Specific examples of alcohol compounds include substituted or unsubstituted oxetane monool, substituted or unsubstituted oxetane monomethanol, oxapentane mono(di)ol, oxacyclohexane mono(di)ol, isosorbitol, mannitol, oxanorbornane mono(di)ol, oxanorbornane monool monomethanol, oxanorbornane mono(di)methanol, oxatricyclodecane mono(di)ol, oxaadamantane mono(di)ol and dioxorane menthanol.

Among these compounds, it is more preferable to employ those having a cyclic skeleton represented by the aforementioned general formula (VE2-a) or (VE2-b) wherein the ratio between the number of oxygen atom and the number of carbon atom (the number of oxygen atom/the number of carbon atom) is higher than 0.08. The employment of these vinyl ether compounds is effective in obtaining an ink which is capable of exhibiting excellent characteristics related to polarity such as solubility and wettability to a printing medium. The ratio (the number of oxygen atom/the number of carbon atom) should more preferably be 0.15 or more, most preferably be 0.25 or more.

As for specific examples of vinyl ether compounds, they include Cas No. 22214-12-6 and Cas No. 20191-85-9. The scope of these vinyl ether compounds includes a distorted cyclic ether structure such as oxetane ring and hydrofuran ring. Due to this structure, these vinyl ether compounds are enabled to exhibit high reactivity. Among these vinyl ether compounds, those having a hydrofuran ring are preferable in terms of volatility. When this cyclic structure is formulated to have a bridged structure, the hardness of cured material can be further enhanced and hence such a cyclic structure is more preferable. More specifically, the vinyl ether shown below would be most preferable.

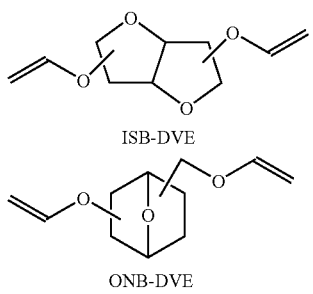

ISB-DVE

ONB-DVE

Especially, it is preferable to employ the compound (ONB-DVE) in combination with 3-ethyl-3-(phenoxymethyl)oxetane. When these compounds are included in an organic dispersion medium, it is possible to obtain a cured material which is capable of further enhancing the adhesion thereof to various kinds of recording medium while securing a high cured hardness. In particular, the adhesion of cured material to a metallic recording medium can be more prominently enhanced.

A series of vinyl ether compounds described above can be suitably synthesized using the method described, for example, in J. Chem. Soc., 1965 (2) 1560-1561 or in J. Am. Chem. Soc. Vol. 124, No. 8, 1590-1591 (2002). According to this method, a corresponding aromatic alcohol compound or alicyclic alcohol compound is employed as a starting material, which is then reacted with acetic ester of vinyl ether or propenyl ether in the presence of a catalyst such as iridium halide, thereby easily obtaining a vinyl ether or propenyl ether compound, which is aimed at. For example, menthol vinyl ether (MTVE) can be obtained by mixing, under a heated condition, menthol together with vinyl acetate in a mixed solution of toluene and sodium carbonate in the presence of iridium compound employed as a catalyst and in an argon atmosphere.

This synthesizing method can be suitably employed in the synthesis of any of the compounds exemplified in this specification.

The concentration of the aforementioned vinyl ether compounds in the photosensitive inkjet ink according to one embodiment of the present invention is confined to 30% or more based on a total weight of the organic dispersion medium. When the concentration of the vinyl ether compounds is less than 30% based on a total weight of the organic dispersion medium, it would be impossible to obtain an inkjet ink which is capable of exhibiting a sufficient hardness after the curing thereof and capable of forming a cured material which is high in adhesion. Further, when an oxirane compound which is relatively low in Ames safety is employed, the safety as a photosensitive ink may be degraded.

These vinyl ether compounds may be employed singly or in combination of two or more kinds.

A least one of polymeric compounds selected from the aforementioned oxetane compound and the aforementioned specific kinds of vinyl ether compound is required to be a monofunctional compound. When a monofunctional compound is included in the photosensitive inkjet ink, the shrink characteristics of cured material to be obtained can be controlled. Namely, when the monofunctional compound is appropriately incorporated in the dispersion medium, the shrinkage to be generated in the curing process of the acid-polymerizable compound can be suppressed, resulting in the enhancement of adhesion of the cured ink. The concentration of the monofunctional compound should be confined to the range of 20 to 70% based on a total weight of the organic dispersion medium. If the concentration of the monofunctional compound is less than 20% by weight, it may become difficult to form a cured film which is excellent in adhesion to a substrate. On the other hand, if the concentration of the monofunctional compound exceeds 70% by weight, the hardness of the cured film to be obtained may become insufficient, thus raising problems. Preferably, the concentration of the monofunctional compound should be confined to the range of 30 to 50% based on a total weight of the organic dispersion medium.

The organic dispersion medium to be incorporated in the photosensitive inkjet ink according to this embodiment may further contain an oxirane compound. As for the oxirane compound, it is possible to employ any kinds of compounds which can be generally employed as epoxy resin. As for specific examples of the oxirane compound, they include monomer, oligomer and polymer of aromatic epoxide, alicyclic epoxide and aliphatic epoxide.

Specific examples of the oxirane compound include alicyclic epoxy compounds such as Celloxide 2021, Celloxide 2021A, Celloxide 2021P, Celloxide 2081, Celloxide 2000 and Celloxide 3000 (all available from DAICEL Chemical Industries Ltd.); (metha)acrylate compounds having epoxy group, such as Cyclomer A200 and Cyclomer M100; methacrylate having methylglycidyl group such as MGMA; glycidol representing a low molecular epoxy compound; β-methylepichlorohydrin; α-pinene oxide; α-olefin monoepoxide having 12 to 14 carbon atoms; α-olefin monoepoxide having 16 to 18 carbon atoms; epoxidized soy bean oil such as Dimac S-300K; epoxidized linseed oil such as Dimac L-500; and polyfunctional epoxy compounds such as Epolead GT301 and Epolead GT401. Further, it is also possible to employ alicyclic epoxy compounds (such as Cylacure; Dow Chemical Co., Ltd, U.S.); low molecular weight phenol compounds which are hydrogenated and aliphatized with terminal hydroxyl group thereof being substituted by a group having epoxy; glycidyl ether of polyhydric aliphatic alcohol/alicyclic alcohol such as ethylene glycol, glycerin, neopentyl alcohol, hexanediol and trimethylol propane; glycidyl ether of hexahydrophthalic acid; and glycidyl esters of hydrogenated aromatic polyhydric carboxylic acid.

Especially, epoxy compounds having an alicyclic skeleton can be preferably employed, since it is possible, with the employment of such epoxy compounds, to secure a some degree of high boiling point and low viscosity in addition to the high reactivity thereof.

Further, as for the epoxy compound which is not so high in mutagenicity in the AMES test, it is preferable to employ those which are not so small in molecular weight. Namely, alicyclic epoxy compounds such as Celloxide 3000 can be preferably employed. Incidentally, an alicyclic epoxy compound having a molecular weight ranging from 150 to 300 is preferable. If the molecular weight of the alicyclic epoxy compound is less than 150, the mutagenicity thereof may become higher. On the other hand, if the molecular weight of the alicyclic epoxy compound is higher than 300, the discharge performance of the inkjet ink is more likely to be degraded.

The concentration of these oxirane compounds should preferably be confined to 30% or less based on a total weight of the dispersion medium. When the oxirane compound is incorporated within this range, it is possible to further enhance the adhesion. However, when the concentration of these oxirane compounds is larger than 30% by weight, the solvent resistance of coated film may be degraded. Further, when an alicyclic epoxy compound which is high in volatility is incorporated in the ink, the discharge performance of the ink would be degraded.

When the concentration of the oxirane compound is confined to 30% or less based on a total weight of the organic dispersion medium, the concentration of the oxetane compound should preferably be confined to the range of 20 to 60% based on a total weight of the organic dispersion medium. When the oxetane compound is incorporated within this range, it is possible to form a cured film of ink which is further improved in film strength without degrading the adhesion thereof.

When the oxirane compound is incorporated in the organic dispersion medium, the oxirane compound or the oxetane compound should preferably be formed of a monofunctional compound, respectively. When any of these compounds employed is monofunctional, the adhesion of the cured film of ink can be further enhanced.

For example, a photosensitive inkjet ink comprising 20 to 40% by weight of a monofunctional oxetane compound, 10 to 30% by weight of a bifunctional oxetane compound, 3 to 20% by weight of an oxirane compound, and 30 to 50% by weight of a vinyl ether compound is capable of forming a cured ink film which is improved in mechanical strength and is especially excellent in solvent resistance.

Additionally, if required, the following dispersion mediums may be employed as an organic dispersion medium to be included in the photosensitive inkjet ink of the present invention.

These dispersion mediums should preferably be formed of a polymerizable compound which is capable of cross-linking in the presence of an acid and selected from those singly exhibiting a fluidity of about 100 cp (=mPa·s) or less at a temperature of 50° C. Specific examples of such a polymerizable compound include acrylic or vinyl compounds having molecular weight of 1000 or less and having, on their side chain, a cyclic ether group such as epoxy group, oxetane group and oxorane group; carbonate compounds; low molecular melamine compounds; vinyl ethers; vinyl carbazoles; styrene derivatives; alpha-methylstyrene derivatives; vinyl alcohol esters including esters of vinyl alcohol with acryl or methacryl; and other kinds of monomers having a cation polymerizable vinyl bond.

In addition to the aforementioned organic dispersion medium, a photo-acid generating agent is incorporated as an essential component of the inkjet ink according to one embodiment of the present invention. This photo-acid generating agent (which is also referred to as cationic photopolymerization initiator) is formed of a compound which is capable of generating an acid when it is irradiated with light. As for this photo-acid generating agent, onium salts are most preferably employed. Examples of onium salts useful herein include diazonium salts, phosphonium salts, sulfonium salts and iodonium salts having, as a counter ion, fluoroboric acid anion, hexafluoroantimonic acid anion, hexafluoroarsenic acid anion, hexafluorophosphate anion, trifluoromethane sulfonate anion, paratoluene sulfonate anion, paranitrotoluene sulfonate anion, halogen-based anion, sulfonic acid-based anion, carboxylic acid-based anion, or sulfate anion. Among these onium salts, it is more preferable, from the viewpoints of the safety of photosensitive inkjet ink and environmental consideration, to select those having an anion species which does not include boron, antimony or arsenic. Among these anion species, hexafluorophosphate anion is most preferable.

More specific examples of such onium salts are compounds represented by the following chemical formulas.

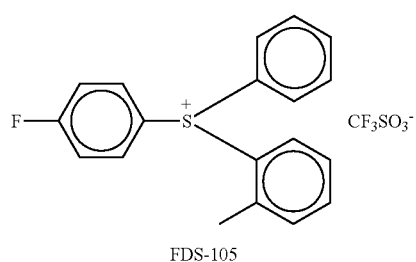

FDS-105

-continued
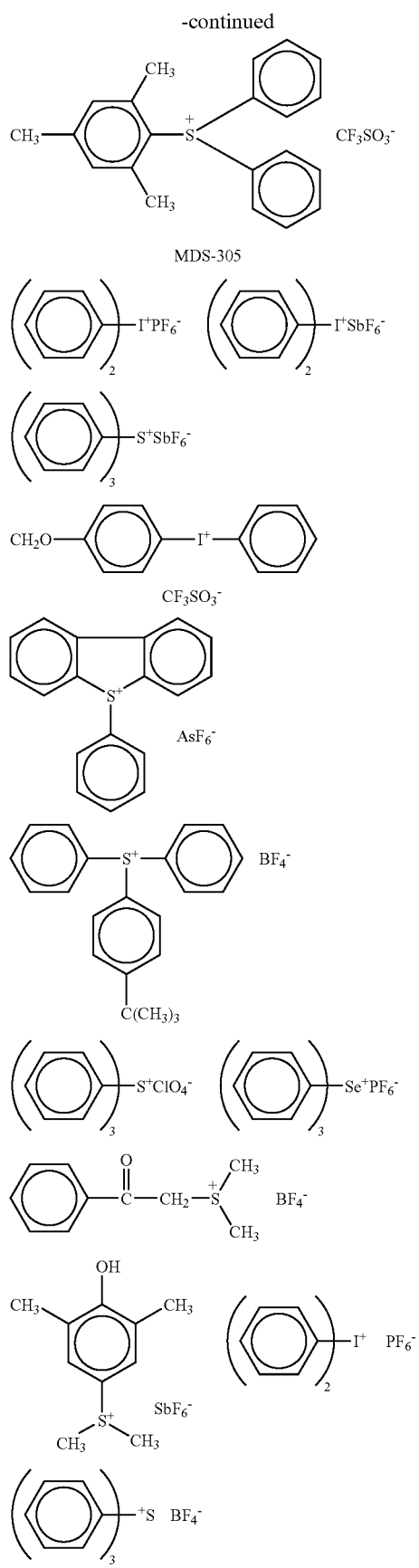
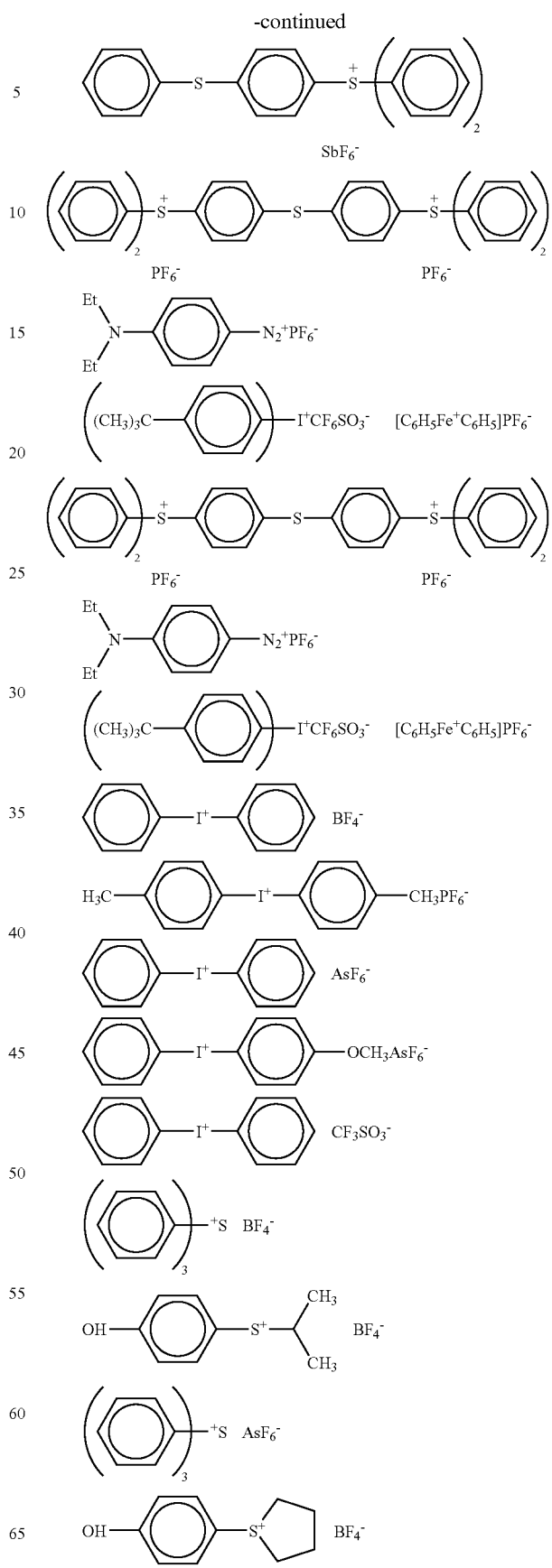

-continued

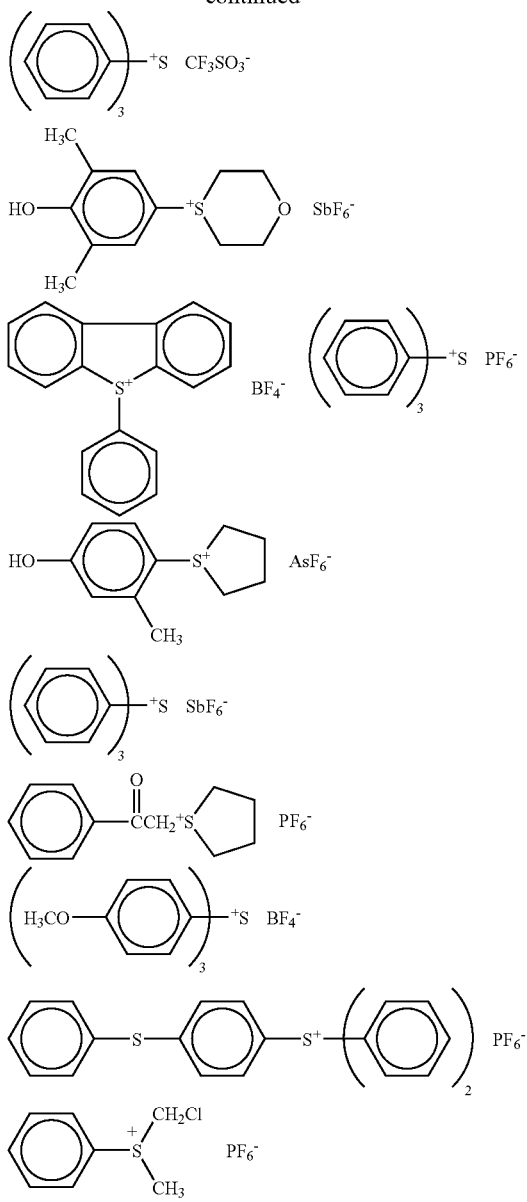

Specific examples of onium salts available in the market are, for example, MPI-103 (CAS. NO. [87709-41-9]; Midori Kagaku Co., Ltd.), BDS-105 (CAS. NO. [145612-66-4]; Midori Kagaku Co., Ltd.), NDS-103 (CAS. NO. [110098-97-0]; Midori Kagaku Co., Ltd.), MDS-203 (CAS. NO. [127855-15-5]; Midori Kagaku Co., Ltd.), DTS-102 (CAS. NO. [75482-18-7]; Midori Kagaku Co., Ltd.), DTS-103 (CAS. NO. [71449-78-0]; Midori Kagaku Co., Ltd.), MDS-103 (CAS. NO. [127279-74-7]; Midori Kagaku Co., Ltd.), MDS-105 (CAS. NO. [116808-67-4]; Midori Kagaku Co., Ltd.), MDS-205 (CAS. NO. [81416-37-7]; Midori Kagaku Co., Ltd.), BMS-105 (CAS. NO. [149934-68-9]; Midori Kagaku Co., Ltd.), TMS-105 (CAS. NO. [127820-38-6]; Midori Kagaku Co., Ltd.), UVACURE 1591 and 1590 (DAICEL UCB Co, Ltd.); UVI-6992 and 6976 (Dow Chemical Co., Ltd.), ESACURE-1064 (Lamberty Co., Ltd.); and IRGACURE 250 (Ciba-Geigy Co., Ltd.).

Among the aforementioned onium salts, sulfonium salt and iodonium salt are more excellent in stability. However, it is known that due to the process in the manufacture of these onium salts, these onium salts are unavoidably formed of a mixture containing monovalent salt (a salt consisting of monovalent cation and one anion) and up to about 75% of not less than 2-valent salt (a salt consisting for example of bivalent cation and a couple of anions), so that the products of these onium salts available in the market are also formed of such a mixture of onium salts. This trend becomes more prominent in the case of sulfonium salts. It is known that when a multi-valent salt is included in the photosensitive inkjet ink, the photosensitive wavelength thereof is enabled to shift toward longer wavelength side, thereby generally rendering the photosensitive inkjet ink to become higher in sensitivity. With a view to take advantage of this merit, a salt of not less than 2-valency is sometimes deliberately incorporated in the ink. For example, UVACURE 1591 and 1590 (DAICEL UCB Co, Ltd.), UVI-6992 and 6976 (Dow Chemical Co., Ltd.), ESACURE-1064 (Lamberty Co., Ltd.), etc. are produced based on such a concept. However, multi-valent salts may badly affect the flocculation stability of the pigment dispersion to be employed in the photosensitive inkjet ink where minute particles are required to be employed in particular. More specifically, the employment of multi-valent salts may lead to the generation of a weak linkage between pigment particles and a dispersant, thereby giving rise to the generation of gelling or flocculation. Therefore, the suppression, as much as possible, of the presence of these multi-valent salts in the photosensitive inkjet ink would generally lead to the improvement of dispersion stability of pigment particles as well as the improvement of discharge performance of inkjet ink.

Since fluorophosphates salt of aryl sulfonium and fluorophosphates salt of aryl iodonium are very excellent in enhancing flocculation stability of color pigments among the aforementioned onium salts, the employment of these fluorophosphates salts is preferable. Even in the case of monovalent onium salts, they are capable of gradually substituting, with time, for a terminal amine resin employed as a dispersant if the dispersant become insufficient. Therefore, it is desirable that onium salts should be constructed such that they cannot be easily moved into the joint portion between the surface of pigment and the terminal of dispersant. This can be realized using an onium salt compound having in its structure a relatively large substituent group. Further, since the adsorption of ion onto the surface of pigment would be minimized by steric hindrance, the benzene ring in the onium salt should preferably have an organic group having 1 to 20 carbon atoms. It is further preferable that not less than 50% of benzene ring is provided with an organic group having 4 to 20 carbon atoms. If the benzene ring is formulated in this manner, the scattering of decomposed matters into air would be suppressed during the photo-reaction in addition to the improvement of dispersion stability, thereby making it possible to enhance the safety. Further, since these compounds are more excellent in solubility to a solvent, the phenomenon of the precipitation of salts in the photosensitive inkjet ink can be also suppressed. Additionally, the employment of these compounds is effective in minimizing the generation of particles of several microns in size that tends to become a cause for the delivery failure of ink and hence the employment of these compounds is very preferable.

When a monovalent onium salt is employed, the photosensitive wavelength thereof shifts toward the short wavelength side, thereby likely causing the sensitivity thereof to degrade. However, when sulfur or oxygen, both being VI elements, is included in a heterocycle or when an aromatic substituent group having sulfur or oxygen as a linking group therein is included in a chemical structure, the aforementioned problem can be overcome and hence such structures are preferable.

An onium salt comprising a relatively large organic group in its structure as shown in the following general formula (2) or (3) is advantageous in the respects that it is excellent in dissolution stability and dispersion stability.

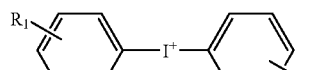

(2)

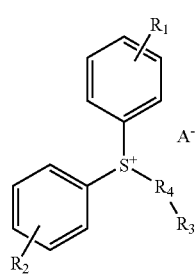

(3)

Herein, $A^-$ is fluorophosphate anion; $R_1$, $R_2$ and $R_3$ may be the same or different and at least one of them is an organic group having 4 to 20 carbon atoms and the rest is an organic group having 1 to 20 carbon atoms and including hydrogen atom; and $R_4$ is a bivalent aromatic substituent group or a bivalent aromatic substituent group containing a VI atom therein.

As for specific examples of the organic group to be introduced into $R_1$, $R_2$ and $R_3$, they include alkyl group having 4 to 20 carbon atoms such as propyl, butyl, hexyl, heptyl, octyl, nonyl, decanyl, etc.; alkyloxy group having 4 to 20 carbon atoms such as propyloxy, butyloxy, hexyloxy, heptyloxy, octyloxy, nonyloxy, decanyloxy, etc.; and a substituent group having 4 to 20 carbon atoms and polyethylene oxide skeleton where ethylene glycol is dehydrocondensed. As for specific examples of the bivalent aromatic substituent group to be introduced into $R_4$, they include a group having a phenylene skeleton such as phenylene and biphenylene; a group having a phenylene sulfide skeleton such as phenylene sulfide and phenylene disulfide; a group having a thiophene skeleton such as benzothiophenylene, thiophenylene and bithiophenylene; and a group having a furan skeleton such as furanylene and benzofuranylene.

The aforementioned onium salts are known to suppress the generation of harmful by-product such as benzene during the process of photo-reaction. When a dispersion containing these onium salts is employed as a photo-acid generating agent, it is possible to obtain a photosensitive inkjet ink which is provided with desirable properties in terms of environment and safety.

The concentration of the photo-acid generating agent in the photosensitive inkjet ink may be suitably determined based on the acid-generating efficiency thereof and on the quantity of color component to be added. In this embodiment, the photo-acid generating agent is incorporated in the photosensitive inkjet ink, from the viewpoint of the sensitivity, at a concentration of 1 to 10% by weight in general based on 100% by weight of the dispersion medium to be polymerized by the effect of acid included in the photosensitive inkjet ink.

If the concentration of the photo-acid generating agent is less than 1% by weight, the sensitivity of the inkjet ink would be degraded. On the other hand, if the photo-acid generating agent is excessively incorporated exceeding 10% by weight, it would lead to the deterioration of dispersion or the dark polymerization of dispersion medium, thereby vigorously increasing the viscosity of ink with time. Due to these phenomena, the film-forming property of ink as well as the hardness of cured material after the photo-curing would be degraded. Additionally, the excessive incorporation of the photo-acid generating agent may lead to the corrosion of the piping or head member of the recording apparatus.

The concentration of the photo-acid generating agent should preferably be confined to 2 to 8% by weight, more preferably to 2 to 6% by weight. However, if it is required to further enhance the dispersion stability of pigment or to further minimize the corrosion of the piping or head member of the recording apparatus, it is preferable to incorporate a sensitizing agent concurrent with the photo-acid generating agent. In this case, it is possible to reduce the concentration of the photo-acid generating agent to the range of about 2 to 4% by weight.

As for specific examples of the sensitizing agent, they include acridine compounds, benzofuravins, perylene, anthracene, thioxantone compounds and laser dyes. Among them, a compound derived from dihydroanthracene where hydrogen atom thereof is substituted by an organic group or thioxantone derivatives are expected to exhibit excellent effects and hence desirable. As long as the sensitizing agent is mixed with the photo-acid generating agent at a concentration ranging from 20 to 100% based on the weight of the photo-acid generating agent, the sensitizing agent is enabled to exhibit the effects thereof. In view of the solubility thereof to the acid-polymerizable compound as well as in view of the sensitizing effects thereof, the concentration of the sensitizing agent should preferably be confined within the range of 30 to 60% by weight.

The aforementioned onium salts may be employed in combination with a nonpolar photo-acid generating agent which is capable of generating a relatively strong acid of different kind. When the nonpolar photo-acid generating agent is incorporated in this manner, the concentration of the onium salt can be reduced, thus making it possible to further suppress the flocculation with time of the ink. As for specific examples of such a nonpolar photo-acid generating agent, they can be selected from the group consisting of sulfonyl compounds, sulfonate compounds, sulfamide compounds and organic halogen compounds. Among them, compounds which are capable of generating a strong acid such as fluoromethane sulfonic acid, hydrochloric acid or bromic acid are preferable for use as a photo-acid generating agent.

As for the onium salts, specific examples thereof include a sulfamide compound such as trifluoromethane sulfonamide of N-hydroxynaphthalimide, and organic halide compounds such as triazine halide compound. The concentration of these onium salts may be confined to the range of 0.3 to 2% based on 100% by weight of the organic dispersion medium. In this case, the concentration of the nonpolar photo-acid generating agent may preferably be confined to the range of 2-10% based on 100% by weight of the organic dispersion medium.

As for the pigments to be included in the photosensitive inkjet ink according to one embodiment of the present invention, there is not any particular limitation and hence any kinds of pigments can be employed as long as they are generally known to be useful as a pigment and are capable of being dispersed. More specifically, there is not any particular limitation with respect to the pigments as long as they are capable of developing desired optical coloring and tinting features and the average particle diameter thereof is confined to 300 nm or less. If the average particle diameter of pigments is larger than 300 nm, various problems may occur in the delivery of ink from the inkjet head such as the disorder in ejecting configuration of ink, the deterioration in reproducibility of printing, and, in the worst case, the delivery failure of ink or the clogging of ink. Therefore, the average particle diameter of pigments in the ink should be regulated to 300 nm or less.

The pigments may be further provided with other properties such as magnetism, fluorescence, conductivity, dielectric property, etc. in addition to the coloring and tinting properties. If the pigments are provided with these various properties, it may become possible to obtain an image having various functions. Further, the pigments may contain particles which are effective in providing an ink layer with increased heat resistance or physical strength.

As for the examples of pigments, they include photoabsorptive pigments for example. Specific examples of such photoabsorptive pigments include carbonaceous pigment such as carbon black, carbon refined and carbon nanotube; metal oxide pigments such as iron black, cobalt blue, zinc oxide, titanium oxide, chromium oxide and iron oxide; sulfide pigments such as zinc sulfide; phthalocyanine pigments; pigments formed of salts such as metal sulfate, metal carbonate, metal silicate and metal phosphate; and pigments formed of metal powder such as aluminum powder, bronze powder and zinc powder.

Further, it is also possible to employ organic pigments, for example, dye chelate; nitro pigments; aniline black; nitroso pigments such as naphthol green B; azo pigments (including azo lake, insoluble azo pigment, condensed azo pigment, chelate azo pigment) such as Bordeaux 10B, Lake red 4R and chromophthal red; Lake pigments such as Peacock blue lake and Rhodamine lake; phthalocyanine pigments such as phthalocyanine blue; polycyclic pigments (such as perylene pigment, perinone pigment, anthraquinone pigment, quinacridone pigment, dioxane pigment, thioindigo pigment, isoindolinone pigment, quinophthalene pigment, etc.); threne pigments such as thioindigo red and indanthrone blue; quinacridone pigment; quinacridine pigment and isoindolinone pigment.

As for the pigments that can be employed in a black ink, examples thereof include carbon black such as Raven 5750, Raven 5250, Raven 5000, Raven 3500, Raven 1255 and Raven 700 (Colombia Co., Ltd.); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (Cabot Co., Ltd.); No. 2300, No. 900, MCF88, No. 33, No. 40, No. 45, No. 52, MA7, MA8, MA100 and No. 2200B (Mitsubishi Chemical Co., Ltd.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 and Special Black 250 (Dexa Co., Ltd.).

As for the pigments that can be employed in a yellow ink, examples thereof include C.I. Pigment Yellow 128, C.I. Pigment Yellow 129, C.I. Pigment Yellow 151, C.I. Pigment Yellow 154, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 139, C.I. Pigment Yellow 150 and C.I. Pigment Yellow 180. Among these yellow pigments, the employment of nickel azo-based pigments or isoindoline pigments is especially preferable. Among these pigments, Pigment Yellow 150 and Pigment Yellow 139 are more preferable since these yellow pigments are excellent in dispersion stability.

As for the pigments that can be employed in a magenta ink, examples thereof include C.I. Pigment Red 123, C.I. Pigment Red 168, C.I. Pigment Red 184, C.I. Pigment Red 202, C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112 and C.I. Pigment Violet 19.

Further, as for the pigments that can be employed in a cyanine ink, examples thereof include C.I. Pigment Blue 15, C.I. Pigment Blue 15:3, C.I. Pigment Blue 15-15:2, C.I. Pigment Blue 15:3-15:4, C.I. Pigment Blue 15:5, C.I. Pigment Blue 15:34, C.I. Pigment Blue 16, C.I. Pigment Blue 17, C.I. Pigment Blue 20, C.I. Pigment Blue 22, C.I. Pigment Blue 25, C.I. Pigment Blue 45, C.I. Pigment Blue 60, C.I. Pigment Blue 1, C.I. Pigment Blue 2, C.I. Pigment Blue 3, C.I. Acid Blue 45, C.I. Vat Blue 4, and C.I. Vat Blue 60. Among these cyan pigments, phthalocyanine-based pigments are preferable since these pigments are minimal in color deterioration even if they are exposed to an acid. Further, in view of excellence in dispersion stability and tinting, the employment of Pigment Blue 15:3 is most preferable.

Further, it is also possible to employ white pigments such as natural clay, metal carbonates such as white lead, zinc white and magnesium carbonate; metal oxides such as barium oxide and titanium oxide. The inkjet ink containing white pigments can be employed not only in white printing but also in the amendments of printing or underlying images through overwriting.

As for fluorescent pigments, it is possible to employ either inorganic fluorescence materials but also organic fluorescence materials. As for the inorganic fluorescence materials, specific examples of which include $MgWO_4$, $CaWO_4$, $(Ca, Zn)(PO_4)_2:Ti^+$, $Ba_2P_2O_7:Ti$, $BaSi_2O_5:Pb^{2+}$, $Sr_2P_2O_7:Sn^{2+}$, $SrFB_2O_{3.5}:Eu^{2+}$, $MgAl_{16}O_{27}:Eu^{2+}$, and inorganic acid salts such as tungstenate and sulfate. As for the organic fluorescence materials, specific examples of which include acridine orange, amino acridine, quinacrine, anilinonaphthalene sulfonate derivatives, anthroyl oxystearic acid, auramine O, chlorotetracycline, cyanine dye such as merocyaninen and 1,1'-dihexyl-2,2'-oxacarboxycyanine, dansyl sulfonamide, dansyl choline, dansyl galactoside, dansyl tolidine, dansyl chloride derivatives such as dansyl chloride, diphenyl hexatriene, eosin, ε-adenosine, ethidium bromide, fluorescein, foamycine, 4-benzoylamide-4'-aminostilbene-2,2'-sulfonic acid, β-naphthyl triphosphic acid, oxonol dye, parinaric acid derivatives, perylene, N-phenylnaphthyl amine, pyrene, safranine O, fluorescamine, fluorescein isocyanate, 7-chloronitrobenzo-2-oxa-1,3-diazole, dansylaziridine, 5-(iodoacetamide ethyl)aminonaphthalene-1-sulfonic acid, 5-iodoacetamide fluorescein, N-(1-anilinonaphthyl 4) maleimide, N-(7-dimethyl-4-methylcumanyl)maleimide, N-(3-pyrene) maleimide, eosin-5-iodoacetamide, fluorescein mercury acetate, 2-[4'-(2"-iodoacetamide)]aminonaphthalene-6-sulfonic acid, eosin, Rhodamine derivatives, organic EL dye, organic EL polymer, organic EL crystal and dendrimer.

As for the powder which is capable of enhancing the heat resistance and physical strength of ink layer, it is possible to employ, for example, the oxides or nitrides of aluminum and of silicon, filler, silicon carbide, etc. Further, in order to provide the ink layer with conductivity, it is possible to incorporate various kinds of powder such as conductive carbon pigment, carbon fiber, copper, silver, antimony or noble metals. Iron oxide powder and ferromagnetic powder are suited for providing magnetism to the ink layer. Metal oxide powder which is high in dielectric constant such as tantalum oxide powder and titanium oxide powder can be incorporated in the photosensitive inkjet ink.

In the inkjet ink according to one embodiment of the present invention, it is also possible to incorporate dyes as an auxiliary component of pigment in the ink for the purpose of adjusting the color of ink. For example, dyes which are low in acidity and basicity and excellent in solubility to a solvent, such as azoic dye, sulfur (building materials) dye, disperse dye, fluorescent brightening agent and oil soluble dye can be employed. Among them, it is more preferable to employ oil soluble dye such as azo dye, triaryl methane dye, anthraquinone dye and azine dye. Specific examples of such an oil soluble dye include C.I. Slovent Yellow-2, 6, 14, 15, 16, 19, 21, 33, 56, 61 and 80; Diaresin Yellow-A, F, GRN and GG; C.I. Slovent Violet-8, 13, 14, 21 and 27; C.I. Disperse Violet-1; Sumiplast Violet RR; C.I. Slovent Blue-2, 11, 12, 25 and 35; Diresin Blue-J, A, K and N; Orient Oil Blue-IIN, #603; and Sumiplast Blue BG.

These pigments and dyes described above may be employed singly or in combination of two or more kinds for the purpose of enhancing the photoabsorbance, chroma and color vision.

The average particle diameter of the aforementioned powder should be as small as possible, provided that they can be appropriately discharged from the inkjet head in the delivery of inkjet ink and that the function thereof is not substantially hindered. Generally, the average particle diameter of the powder is confined to not larger than ⅓, more preferably about ¹⁄₁₀ of the diameter of the pore size of nozzle through which the inkjet ink is to be discharged. Incidentally, the diameter of the pore size of nozzle is typically 10 μm or less, more preferably 5 μm or less. Therefore, a preferable particle diameter of the powder to be employed in the inkjet ink for printing should be 0.3 μm or less and is usually confined within the range of 0.05 to 0.2 μm.

In order to enhance the dispersibility of pigment, etc., a small quantity of a dispersing agent such as a nonionic surfactant, an inonic surfactant or an electrifying agent may be incorporated in the inkjet ink according to one embodiment of the present invention. A polymer dispersing agent such as acrylic compound and vinyl alcohol, both having dispersing properties, may also be suitably employed in the inkjet ink. However, when a cationic dispersing agent is employed as a dispersing agent, it is preferable to select it from compounds whose acidity is lower than that of carboxylic acid. The reason is that, among the cationic dispersing agents, some kinds thereof may promote the curing dark reaction of ink. Further, the dispersing agents and colorants that exhibit strong basicity are also undesirable in that they not only degrade the sensitivity of ink but also promote the curing dark reaction of ink likewise. Therefore, these dispersing agents should desirably be selected from the compounds which are nearly neutral or nonionic.

In order to adjust the surface tension, etc., a small quantity of low molecular additives such as a nonionic surfactant, an inonic surfactant, an electrifying agent may be added to the inkjet ink.

More specifically, it is possible to employ, as a polymer dispersing agent, Solsperse 24000 and Solsperse 32000 (all available from Avisia Co., Ltd.). These polymer dispersing agents may be incorporated at a concentration ranging from 5-30% or so based on the weight of the pigment in order to enable them to exhibit the effects thereof.

The inkjet ink according to one embodiment of the present invention is required to be fluid at ordinary temperature. More specifically, the ink to be employed in inkjet printing should preferably be selected from those exhibiting a viscosity of 50 cp (=mPa·s) or less, more preferably 30 mPa·s or less at a temperature of 25° C. Further, when the inkjet head is temperature controllable, the ink should preferably be selected from those exhibiting a viscosity falling within the range of 5 to 20 mPa·s at the controlled temperature of the inkjet head.

In order to enhance the dispersion stability of pigment, an additive may be incorporated in the inkjet ink according to one embodiment of the present invention. For example, in addition to the incorporation of the aforementioned resinous dispersing agent on the occasion of dispersing the pigment, a resin having, on its terminal, a basic group such as amino group may be incorporated as a second dispersing agent on the occasion of preparing the ink. As a result, due to the adsorption or interaction of an ionic compound such as the photo-acid generating agent, repulsive force is generated entirely between the pigment particles, each of them being surrounded with a first resinous dispersing agent, thereby dispersion stability being developed As for the second resinous dispersing agent satisfying the aforementioned conditions, it is generally possible to employ polyolefin, polyester and epoxy resin each having amino terminal even though it cannot be definitely determined because of the combination thereof with the first resinous dispersing agent. More specifically, it is possible to employ polyepoxy compounds which can be derived from a reaction between a linear polymer having a number average molecular weight of 500-50,000 and carboxyl group on one end thereof and an organoamino compound having one secondary amino group and which have amine value of 5-200 mgKOH/g and a number average molecular weight of 1,000-100,000. it is also possible to employ, as the second resinous dispersing agent, polyallylamine derivatives which can be derived from a reaction between polyallyl amine and at least one compound selected from a co-condensed product of polyester having free carboxyl group and amide, a co-condensed product (polyester amide) of polyamide having free carboxyl group and amide, and a co-condensed product (polyester amide) of ester and amide.

The following compounds can be also employed as the second resinous dispersing agent. Namely, they are polyester polymers which can be derived from a reaction between a compound having a number average molecular weight of 500-50,000 and carboxyl group on one end thereof and a compound having one secondary amino group and which have amine value of 5-200 mgKOH/g and a number average molecular weight of 1,000-100,000; and polyester polymers which can be derived from a reaction between polyester and acrylic polymer having tertiary amino group and/or a basic nitrogen-containing heterocyclic group and which have amine value of 10-200 mgKOH/g and a number average molecular weight of 1,000-100,000.

As for specific examples of the polyepoxy compound, they include, for example, polyglycidyl ether compounds such as ethyleneglycol diglycidyl ether, polyethyleneglycol diglycidyl ether, propyleneglycol diglycidyl ether, polypropyleneglycol diglycidyl ether, neopentylglycol diglycidyl ether, 1,6-hexanediol diglycidyl ether, glycelol polyglycidyl ether, trimethylolpropane polyglycidyl ether, diglycelol polyglycidyl ether, polyglycelol polyglycidyl ether, and sorbitol polyglycidyl ether. Further, it is also possible to employ glycidyl ester-containing acrylic polymer which can be derived from the copolymerization between glycidyl(metha)acrylate and a polymerizable vinyl monomer other than the glycidyl (metha)acrylate. In this case, methylmethacrylate and styrene can be employed as the aforementioned polymerizable vinyl monomer.

Although the inkjet ink according to one embodiment of the present invention should desirably be high in stability of delivery of inkjet ink, the viscosity of inkjet ink is generally inclined to readily become higher with time, so that the properties thereof may not be retained for a long period of time. In that case, it is desirable to additionally incorporate, as a viscosity stabilizing agent, a basic compound and/or a compound capable of expressing basicity. These basic compounds are concurrently capable of effectively protecting not only the interior of the inkjet head of recording apparatus but also the metal portions of the piping of ink from being eroded by acids. Therefore, the employment of these basic compounds is preferable in all kinds of the inkjet ink according to one embodiment of the present invention.

As for the aforementioned basic compound, it is possible to employ any kinds of inorganic basic materials as well as organic basic materials which are capable of being dissolved in the aforementioned acid-polymerizable compounds. However, in view of solubility, the employment of organic basic materials is more preferable. Specific examples of such organic basic materials include ammonia, ammonia compound, ammonium compounds, substituted or unsubstituted alkylamine, substituted or unsubstituted aromatic amine, pyridine, pyrimidine, and organic amines having a hetrocyclic skeleton such as imidazole. More specific examples of such organic basic materials include n-hexyl amine, dodecyl amine, aniline, dimethyl aniline, diphenyl amine, triphenyl amine, diazabicyclooctane, diazabicycloundecane, 3-phenyl pyridine, 4-phenyl pyridine, lutidine, 2,6-di-t-butylpyridine, and sulfonyl hydrazides such as 4-methylbenzene sulfonyl hydrazide, 4,4'-oxybis(benzenesulfonyl hydrazide) and sulfonyl hydrazide such as 1,3-benzenesulfonyl hydrazide.

Ammonium compounds can be also employed as a basic compound. Preferable examples of the ammonium compounds are quaternary ammonium salts, wherein the substituent group of the ammonium atom may be methyl, ethyl, propyl, isopropyl, butyl, dodecyl, phenyl or benzyl; and the counter ion which is suitable for use may be anion such as hydroxyl ion, $^-OR$ (R is alkyl having 1 to 4 carbon atoms), $^-OCOR'$ (R' is alkyl, aryl or alkylaryl), $OCOO^-$ and $OSOO^-$. Especially preferable examples of the basic compounds are tetramethyl ammonium hydroxide and ammonium salt of tetrabutyl hydroxide. These basic compounds can be employed singly or in combination of two or more kinds.

When a basic compound exhibiting a very strong basicity such as imidazole is incorporated in this case, the polymerization thereof with time may occur or otherwise, a side reaction such as decomposition of photo-acid generating agent may be likely to take place. On the other hand, if a basic compound which is very weak in basicity is employed in this case, it would become difficult to sufficiently secure the effect of stabilizing the viscosity of ink through the addition of the basic compound. For example, it is preferable to employ basic compounds exhibiting a base dissociation constant pKb of 4 or more at a temperature of 25° C. and in a state of aqueous solution thereof. However, if the pKb of the basic compounds is higher than 11, such compounds would be incapable of exhibiting the effect of stabilizing the viscosity of ink. Suitable examples of basic compounds which are capable of satisfying the aforementioned conditions are pyridine derivatives, aniline derivatives, aminonaphthalene derivatives, other kinds of nitrogen-containing heterocyclic compounds and the derivatives thereof.

Among them, the employment of aniline derivatives as a basic compound is especially preferable in terms of viscosity stability, volatility, basicity and low side-reaction.

However, since the aniline compounds are relatively low basicity, the employment thereof in combination with an oxetane compound exhibiting basicity per se is not preferable in general. The oxetane compound should preferable be selected from those exhibiting such a high basicity that the pKb thereof at 25° C. is confined within the range of 3 to 7. More specifically, basic compounds such as amine having an aliphatic skeleton or amine having an alicyclic skeleton can be suitably employed.

When the aforementioned basic compounds are capable of forming a salt with an anion and if the acidity of the anion is relatively low, the basic compounds will be enabled to exhibit a weak basicity, thereby enabling such basic compounds to be employed likewise.

Although it depends on the kind of compound to be employed, the aforementioned basic compounds may be incorporated at a concentration of several hundreds to several thousands ppm or so based on the acid-polymerizable compound in order to enable the basic compounds to exhibit the effects thereof as a viscosity stabilizing agent.

Next, the method of printing using the inkjet ink according to the present invention will be explained with reference to drawing.

FIGURE is a schematic view of a typical inkjet recording apparatus for performing the recording using the aforementioned inkjet ink. The inkjet recording apparatus 1 shown in FIGURE is provided with a transferring mechanism 3 for transferring a recording medium 2. Along the running direction of the transferring mechanism 3, there are successively disposed, starting from the upstream side to the downstream side, an inkjet type recording head 4, a light source 5 and a heater as a heating mechanism 6.

With respect to the recording medium (or an article to which printing is applied) 2, there is not any particular limitation on the kinds thereof as long as printing can be performed on the recording medium 2. Namely, it is possible to employ, as the recording medium 2, various kinds of materials including paper, an OHP sheet, a resin film, non-woven fabric, a porous film, a plastic plate, a circuit board and a metallic substrate. The inkjet ink according to one embodiment of the present invention is capable of forming a cured material exhibiting a sufficiently high adhesion even if a metallic substrate is employed as the recording medium 2.

The transferring mechanism 3 is constructed so as to enable the recording medium 2 to pass successively through the recording head 4, the light source 5 and the front side of heater 6 for instance. In this case, the transferring mechanism 3 is designed such that the recording medium 2 can be transferred from the right side to the left side in the drawing. This transferring mechanism 3 can be constituted for example by a belt and/or a roller for transferring the recording medium 2, and a driving mechanism for driving the belt and/or the roller. Alternatively, this transferring mechanism 3 may be further provided with a guiding member for assisting the transfer of the recording medium 2.

The recording head 4 is provided so as to deliver an inkjet ink onto the recording medium 2 according to image signals, thereby forming an ink layer. As for the recording head 4, it is possible to employ a serial scanning type head mounted on a carriage or a line scanning type head having a width larger than that of the recording medium 2. In viewpoint of achieving a high-speed printing, the latter head is generally more advantageous as compared with the former head. With respect to the method of delivering an inkjet ink from the recording head 4, there is not any particular limitation. For example, using the pressure of vapor generated by the heat of a heating element, the droplets of ink can be ejected. Alternatively, by a mechanical pressure pulse generated from a piezoelectric element, the droplets of ink can be ejected.

The light source 5 is designed to irradiate light to the ink layer on the recording medium 2, thus enabling an acid to generate in the ink layer. As for the light source 5, it is possible to employ a mercury lamp such as a low, medium or high pressure mercury lamp; a tungsten lamp; an arc lamp; an excimer lamp; an excimer laser, a semiconductor laser; a YAG laser; a laser system constituted by a combination of laser and non-linear optical crystal; a high-frequency induction ultraviolets generating apparatus; an electron beam irradiating apparatus; an X-ray irradiating apparatus; etc. Among them, the employment of the high-frequency induction ultraviolets generating apparatus, the high/low pressure mercury lamp and the semiconductor laser would be more preferable, since these devices are advantageous in simplifying the system involved. The light source 5 may be provided with a converging mirror or a sweep optical system.

The heater 6 employed as a heating mechanism is designed to heat the ink layer on the recording medium 2, thus promoting the crosslinking reaction using an acid as a catalyst. As for this heater 6, it is possible to employ an infrared lamp; a roller housing therein a heating element (heat roller); a blower for ejecting hot air or heated air; etc.

Using the aforementioned apparatus 1, the printing to the recording medium can be performed by the following method.

First of all, by the transferring mechanism 3, the recording medium 2 is transferred from the right side to the left side in the drawing. The transferring speed of the recording medium 2 may be confined for example within the range of 0.1 to several hundreds m/min.

As the recording medium 2 is transferred up to a location in front of the recording head 4, the aforementioned inkjet ink is delivered from the recording head 4 according to the image signals. As a result, a prescribed ink layer (not shown) is formed on the recording medium 2.

Then, the recording medium 2 having the ink layer thereon is transferred to a location in front of the light source 5. When the recording medium 2 passes through a location in front of the light source 5, light is irradiated from the light source 5 to the ink layer on the recording medium 2, thereby enabling an acid to generate in the ink layer. Incidentally, the intensity of irradiated beam at the surface of ink layer may be confined generally within the range of several $mW/cm^2$ to several tens $W/cm^2$ though this range may be varied depending on the wavelength of the light source to be employed. The quantity of exposure to the ink layer can be optionally determined depending on the sensitivity of inkjet ink or on the transferring speed of the printing matter (i.e. the transferring speed of the recording medium 2).

Thereafter, the recording medium 2 is transferred to the interior of or in the vicinity of the heater 6. When the recording medium 2 passes through the interior of or in the vicinity of the heater 6, the ink layer on the recording medium 2 is heated by the heater 6 to promote the crosslinking reaction in the ink layer. Incidentally, in the apparatus shown in FIGURE, the heating time by the heater 6 is generally relatively short, i.e. ranging from several seconds to several tens seconds. Accordingly, if it is desired that the curing of the ink layer is substantially completely accomplished by the heater 6, the heating should be performed at a relatively high temperature with the maximum ultimate temperature being controlled to become relatively high, i.e. about 200° C. or less, more preferably within the range of 60° C. to 200° C., most preferably within the range of about 80° C. to 180° C.

Subsequently, the recording medium 2 is transferred to the interior of stocker (or vessel) (not shown), thus finishing the printing.

The heating mechanism for heating the ink layer may not be restricted to the heater 6 which is disposed at a downstream side of the light source as shown in the drawing. For example, the light source 5 may be utilized as a heating source by moving the light source 5 close to recording medium 2 on the occasion of irradiating light to the ink layer insofar as the printing surface would not be damaged. Likewise, it is also possible to utilize the light source as a heating source by omitting the provision of a heat-dissipating mechanism such as a cold mirror. When a high-output bulb of several hundreds watts is employed as a light source, since a cooling mechanism provided together with the light source, part of the exhaust heat mechanism is modified so as to enable the waste heat to intentionally return to the surface of printing paper. By the provision of such a mechanism, the ink layer can be heated by heat to be generated from the light source.

For example, it is possible to provide a light source having an output of not less than one hundred watts and provided with a mechanism which is capable of re-introducing an air flow which has been once utilized for cooling the light source onto the surface of printing paper or into the interior of transferring/sustaining mechanism so as to utilize the air flow for heating the ink layer. The ultimate temperature of the recording medium that can be realized through the recirculation of heat of the light source may be such that makes it possible to obtain the same degree of effect as obtainable from the heating by the aforementioned heater. Although it depends on the heating time, a preferable range of temperature may be generally at least 60° C. or more, more preferably within the range of 80 to 100° C. When the speed of exposure is relatively high, e.g. several meters/sec., the ultimate temperature may be as high as 180° C. so as to instantaneously heat the recording medium.

When a light source which is capable of generating infrared ray in addition to the visible light is employed as the light source 5 for instance, the irradiation of light and the heating to the recording medium can be concurrently performed. The employment of such a light source is preferable since it will promote the curing of ink layer.

Since the ink layer is heated from the heat generated from the light source 5 as the ink layer is irradiated with light, the heating mechanism may not necessarily be installed as an independent member as in the case of the heater 6. However, if only the heat from the light source 5 is utilized for heating the ink layer and then the heated ink layer is left to stand at the ordinary temperature for completely curing the ink layer, it will take a long time. Therefore, the standing of ink layer at the ordinary temperature should preferably be applied to only on the occasions where sufficiently a long time can be secured for complete curing of the ink layer. For example, in the case of the printed matters such as newspaper which will be distributed next day, it is possible to secure such a long time as about a whole day and night for allowing the ink layer to cure, and therefore it is possible to completely cure the ink layer even if the ink layer is left to stand at the ordinary temperature.

The images (printed matters) to be obtained using the aforementioned recording method and the inkjet ink according to one embodiment of the present invention would be excellent not only in quality of printing but also in curing property, thus making them excellent in four respects, i.e. hardness, adhesion, sun-proof and safety. Namely, in addition to the inhibition of emission of poisonous materials from the printed images after the curing thereof, the reduction of weight of the ink during the exposure thereof can be restricted to within 10%, thus making it possible to desirably minimize the scattering matters in the atmosphere of printing. It is possible, through the curing of the inkjet ink according to one embodiment of the present invention, to obtain printed matters having a cured material which is excellent in adhesion to various kinds of recording mediums and in hardness.

Next, the present invention will be further explained in detail with reference to specific examples as follows.

Prior to the preparation of ink, carbon black employed as a pigment was added together with a dispersing agent to an acid-polymerizable compound according to the following recipe to prepare a colorant dispersion.

Pigment (carbon black) 20 wt %
Dispersant (Solsperse 32000: Avisia Co., Ltd.) 6 wt %
Dispersant (Solsperse 5000: Avisia Co., Ltd.) 0.6 wt %
Acid-polymerizable compound (ONB-DVE) 3.4 wt %

A mixed liquid formed of a mixture of the aforementioned components was introduced into a recirculating bead mill charged with beads of 0.3 mm in diameter and then subjected to a dispersion treatment for about one hour to prepare a color dispersion.

To the color dispersion thus obtained were added an organic dispersion medium, a photo-acid generating agent and other additives to prepare inkjet inks. Following Table 1 shows various combinations of acid-polymerizable compounds to be employed for forming the organic dispersion medium. Herein, the organic dispersion medium was prepared through a combination of vinyl ether compounds and oxetane compounds.

TABLE 1

| No. | Vinyl ether | | | | Oxetane | | |
|---|---|---|---|---|---|---|---|
| | ONB-DVE | ISB-DVE | CHVE | HDCPVE | OXT-211 | OXT-221 | OXT-212 |
| 1 | 30 | | | | 70 | | |
| 2 | 50 | | | | 50 | | |
| 3 | 80 | | | | 20 | | |
| 4 | | 50 | | | 50 | | |
| 5 | 70 | | | 30 | | | |
| 6 | 70 | | | | | 30 | |
| 7 | 80 | | | | | | 20 |
| 8 | 50 | | 10 | | 40 | | |
| 9 | 40 | | 20 | | 40 | | |
| 10 | | 60 | 10 | | 30 | | |
| 11 | 20 | | | | 80 | | |
| 12 | 20 | | | | 40 | 40 | |
| 13 | | 50 | | | 10 | 40 | |
| 14 | | 20 | | 40 | | | 40 |
| 15 | | | 50 | | | | 50 |

The compounds described in above Table 1 were as follows.

ONB-DVE: (DAICEL Chemical Industries Ltd.)
ISB-DVE: (DAICEL Chemical Industries Ltd.)
HDCPVE: (DAICEL Chemical Industries Ltd.)
(The structures of ONB-DVE and ISB-DVE are the same as described above, and HDCPVE corresponds to the aforementioned compound: Ali. 7)
CHVE: Cyclohexane dimethanol divinyl ether (ISP Co., Ltd.)
OXT-211: 3-ethyl-3-(phenoxymethyl)oxetane
OXT-221: di[1-ethyl(3-oxetanyl)]methyl ether
OXT-212: 3-ethyl-3-(2-ethylhexyloxymethyl)oxetane (These oxetane compounds are all manufactured by Toua Gosei Co., Ltd.)

Among seven kinds of acid-polymerizable compounds employed herein, HDCPVE representing a vinyl ether compound, and OXT-211 and OXT-212 both representing an oxetane compound are a monofunctional compound, respectively. Namely, the compositions of Nos. 1-10 in Table 1 were all constructed such that the concentration of the monofunctional compound was confined within the range of 20-70% based on a total weight of the organic dispersion mediums and, moreover, the concentration of the vinyl ether compound represented by the aforementioned general formula (1) was 30% by weight or more. Therefore, these compositions of Nos. 1-10 represent an organic dispersion medium which was designed to be incorporated in the inkjet ink of the examples of the present invention.

The rest of the organic dispersion mediums representing the compositions of Nos. 11-15 fail to satisfy the above-mentioned conditions. More specifically, in the cases of the compositions of Nos. 11 and 12, the concentration of the vinyl ether compound was less than 30% by weight. In the cases of the compositions of Nos. 13 and 15, the concentration of the monofunctional compound was less than 20% based on a total weight of the organic dispersion mediums. In the case of the composition of No. 14, the monofunctional compound was incorporated at a concentration of 80% based on a total weight of the organic dispersion mediums. Therefore, these compositions of Nos. 11-15 represent an organic dispersion medium which was designed to be incorporated in the inkjet ink of the comparative examples.

The organic dispersion mediums of Nos. 1 to 15 were respectively added, together with a photo-acid generating agent and other additives, to the aforementioned colorant dispersion to prepare the inkjet inks of Nos. 1 to 15. With respect to the concentrations of the pigments, the photo-acid generating agent and other additives in any of these inkjet inks of Nos. 1 to 15 were set to the same as shown below.

Pigment (based on a total of dispersing agents) 4 wt %
Photo-acid generating agent; UVACURE1590 (DAICEL Cytech Co., Ltd.) (based on a total of dispersing agents) 7 wt %
Sensitizing agent; DBA (Kawasaki Kasei Co., Ltd.)(based on photo-acid generating agent) 30 wt %
Dispersing agent; Ajisper PB711 (Ajinomoto Finetechno Co., Ltd.) (based on pigment) 20 wt %

The inkjet inks were prepared respectively as follows. First of all, all of the components were mixed together to obtain a mixed liquid, which was then stirred by a homogenizer. Finally, the resultant mixture was filtered using a 5 μm membrane filter to obtain an inkjet ink.

Using a bar coater, each of these inkjet inks was coated on an SUS plate employed as a recording medium to form a coated film having a thickness of about 5 μm, to which UV beam was irradiated from a UV irradiation apparatus. Further, the SUS plate bearing the coated film was placed on a hot plate and subjected to a heat treatment for 10 minutes at a temperature of 100° C. to form a cured material. Additionally, a cured material was formed by repeating the same procedures as described above except that a PET film was employed as a recording medium in place of the SUS plate.

These cured materials were measured with respect to the pencil hardness thereof based on JIS K5600-5-4 and, at the same time, investigated with respect to the adhesion thereof according to the cross-cut tape peeling test. In this cross-cut tape peeling test, the adhesion of cured material was assessed by measuring the ratio of peeled area of the cured material and judged according to the following criterions taking the peeled area into consideration.

Less than 5% of the entire area: Very excellent (⊚)

Less than 10% of the entire area: Excellent (○)

Further, all of the inkjet inks were respectively preserved for two weeks at a temperature of 50° C., thereby determining the shelf stability thereof from the rate of increase of viscosity. Specifically, the viscosity of the ink before and after the preservation respectively measured to determine the rate of increase of viscosity and judged according to the following criterions.

Less than 3%: Excellent (⊚)

Not less than 3%: Somewhat excellent (○)

Not less than 10%: Somewhat bad (Δ)

The results obtained are summarized together with the results of pencil hardness and adhesion in the following Table 2.

inkjet inks were found excellent in adhesion of the cured material thereof to a recording medium. Further, it was confirmed that all of these inkjet inks were satisfactory in preservation properties.

Whereas, in the case of the inkjet inks of Nos. 11-15, it was impossible to obtain a cured material which was satisfactory in pencil hardness and adhesion. Namely, it was impossible to realize a sufficient pencil hardness and a sufficient adhesion which were comparative to those of the examples of the present invention. With respect to the preservation property of inkjet ink also, the inkjet inks of Nos. 11-15 were all inferior to that of the examples of the present invention.

Then, the recipe of the organic dispersion medium was altered to prepare inkjet inks. Following Table 3 shows combinations of acid-polymerizable compounds to be employed for the preparation of the organic dispersing agents. Herein, the organic dispersing agents were prepared from a combination of a vinyl ether compound, an oxetane compound and an oxirane compound.

TABLE 3

| | Vinyl ether | | | Oxetane | | | Oxirane | | |
|---|---|---|---|---|---|---|---|---|---|
| No. | ONB-DVE | ISB-DVE | CHVE | OXT-211 | OXT-221 | OXT-213 | C3000 | PNO | SR-NPG |
| 16 | 50 | | | 40 | | | 10 | | |
| 17 | 40 | | | 50 | | | 10 | | |
| 18 | 30 | | | 40 | | | 30 | | |
| 19 | 40 | | | 30 | | | 30 | | |
| 20 | 50 | | | | | 40 | 10 | | |
| 21 | 45 | | | 40 | 10 | | | 5 | |
| 22 | 45 | | 10 | 40 | | | | 5 | |
| 23 | 40 | | | 30 | 20 | | 10 | | |
| 24 | 35 | | | 40 | 20 | | 5 | | |
| 25 | 35 | | | 35 | 20 | | 10 | | |
| 26 | 30 | | | 30 | 30 | | 10 | | |
| 27 | | 50 | | | 40 | | 10 | | |
| 28 | 20 | | | 40 | | | 40 | | |
| 29 | | 50 | | 10 | 30 | | 10 | | |
| 30 | | | | 40 | 40 | | 20 | | |
| 31 | 20 | | | 40 | 40 | | | | |
| 32 | 20 | | | 20 | 20 | | | | 40 |

TABLE 2

| Ink | SUS plate | | PET film | | |
|---|---|---|---|---|---|
| No. | Hardness | Adhesion | Hardness | Adhesion | Preservation |
| 1 | 2H | ⊚ | H | ⊚ | ○ |
| 2 | 3H | ⊚ | 2H | ⊚ | ⊚ |
| 3 | 3H | ⊚ | 3H | ⊚ | ⊚ |
| 4 | H | ⊚ | H | ⊚ | ⊚ |
| 5 | H | ○ | H | ○ | ○ |
| 6 | H | ○ | H | ○ | ⊚ |
| 7 | H | ○ | H | ○ | ⊚ |
| 8 | 3H | ⊚ | H | ⊚ | ⊚ |
| 9 | 3H | ⊚ | H | ⊚ | ⊚ |
| 10 | 3H | ⊚ | H | ⊚ | ⊚ |
| 11 | B | ○ | B | Δ | Δ |
| 12 | H | Δ | H | Δ | ○ |
| 13 | H | Δ | 2H | Δ | ○ |
| 14 | B | Δ | B | X | ○ |
| 15 | H | X | H | X | Δ |

As shown in above Table 2, the cured materials which were formed using the inkjet inks of Nos. 1-10 all excited excellent adhesion to the SUS plate as well as to the PET film and the pencil hardness thereof was H or more. Moreover, all of these The compounds described in above Table 3 are as follows.

C3000: Celloxide 3000 (DAICEL Chemical Industries Ltd.)

PNO: α-pinene oxide (DAICEL Chemical Industries Ltd.)

OXT-213: 3-(cyclohexyloxy)methyl-3-ethyl oxetane (Toua Gosei Co., Ltd.)

The rest of the compounds are the same as already explained. Among nine kinds of acid-polymerizable compounds shown in above Table 3, OXT-211 and OXT-213 both representing an oxetane compound and PNO representing an oxirane compound are a monofunctional compound, respectively. Namely, the compositions of Nos. 16-26 in Table 3 were all constructed such that the concentration of the monofunctional compound was confined within the range of 20-70% based on a total weight of the organic dispersion mediums and, moreover, the concentration of the vinyl ether compound represented by the aforementioned general formula (1) was 30% by weight or more. Moreover, the concentration of the oxirane compound was confined within the range of 0-30% based on a total weight of the organic dispersion mediums, and the concentration of the oxetane compound was confined within the range of 20-60% based on a total weight of the organic dispersion mediums. Therefore, these compositions of Nos. 16-26 represent an organic dispersion medium which was designed to be incorporated in the inkjet ink of the examples of the present invention.

The rest of the organic dispersion mediums representing the compositions of Nos. 27-32 fail to satisfy the above-mentioned conditions. More specifically, in the cases of the compositions of Nos. 28 and 30-32, the concentration of the vinyl ether compound was less than 30% by weight. In the cases of the compositions of Nos. 27 and 29, the concentration of the monofunctional compound was less than 20% based on a total weight of the organic dispersion mediums. Therefore, these compositions of Nos. 27-32 represent an organic dispersion medium which was designed to be incorporated in the inkjet ink of the comparative examples.

The organic dispersion mediums of Nos. 16 to 32 were respectively added, together with a photo-acid generating agent and other additives, to the aforementioned colorant dispersion to prepare the inkjet inks of Nos. 16 to 32. With respect to the concentrations of the pigments, the photo-acid generating agent and other additives in any of these inkjet inks of Nos. 16 to 32 were set to the same as shown below, thus obtaining inkjet inks according to the same procedures as described above.

Using each of these inkjet inks and by following the same procedures as described above, a cured material was formed on the same kind of recording medium as described above. The hardness and adhesion of the cured materials thus obtained were assessed in the same manner as described above. The results thus obtained are summarized together with the preservation property of ink in the following Table 4.

TABLE 4

| Ink No. | SUS plate Hardness | SUS plate Adhesion | PET film Hardness | PET film Adhesion | Preservation | AMES test |
|---|---|---|---|---|---|---|
| 16 | 2H | ⊚ | H | ⊚ | ⊚ | ○ |
| 17 | 3H | ⊚ | 2H | ⊚ | ⊚ | ○ |
| 18 | 3H | ⊚ | 3H | ⊚ | ⊚ | ○ |
| 19 | 2H | ⊚ | H | ⊚ | ⊚ | ○ |
| 20 | 2H | ⊚ | H | ○ | ⊚ | ○ |
| 21 | 3H | ○ | H | ○ | ⊚ | ○ |
| 22 | 2H | ⊚ | H | ⊚ | ⊚ | ○ |
| 23 | 3H | ⊚ | H | ⊚ | ⊚ | ○ |
| 24 | 3H | ⊚ | H | ⊚ | ⊚ | ○ |
| 25 | 3H | ⊚ | H | ⊚ | ⊚ | ○ |
| 26 | 3H | ⊚ | H | ⊚ | ⊚ | ○ |
| 27 | 3H | X | H | X | ○ | ○ |
| 28 | B | ○ | B | △ | △ | ○ |
| 29 | H | X | H | △ | ○ | ○ |
| 30 | H | X | H | X | ○ | ○ |
| 31 | H | X | F | X | ○ | ○ |
| 32 | 2B | X | 2B | X | ○ | X |

As shown in above Table 4, the cured materials which were formed using the inkjet inks of Nos. 16-26 all exhibited excellent adhesion to the SUS plate as well as to the PET film and the pencil hardness thereof was H or more. Moreover, all of these inkjet inks were found excellent in adhesion of the cured material thereof to a recording medium. Further, it was confirmed that all of these inkjet inks were satisfactory in preservation properties.

Whereas, in the case of the inkjet inks of Nos. 27-32, it was impossible to obtain a cured material which was satisfactory in pencil hardness and adhesion. Namely, it was impossible to realize a sufficient pencil hardness and a sufficient adhesion which were comparative to those of the examples of the present invention. With respect to the preservation property of inkjet ink also, the inkjet inks of Nos. 27-32 were all inferior to that of the examples of the present invention.

It was confirmed that, due to the inclusion of an organic dispersing agent comprising predetermined components, the inkjet inks according to the examples of the present invention were enabled to create a printed matter with a cured material which was excellent in adhesion to various kinds of recording mediums and also in hardness.

According to one aspect of the present invention, it is possible to provide a photosensitive inkjet ink which is excellent in adhesion to various kinds of recording mediums, in particular to a metallic medium, and also in hardness.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photosensitive inkjet ink comprising:
   a photo-acid generating agent;
   pigment; and
   an organic dispersion medium comprising at least one oxetane compound, at least one vinyl ether compound represented by formula (1) and at least one oxirane compound, said at least one oxetane compound comprising a monofunctional oxetane, said monofunctional oxetane being 3-ethyl-3-(phenoxymethyl) oxetane and being present in an amount of 20 to 60% by weight based on a total weight of the organic dispersion medium, the vinyl ether compound being present in an amount of 30% or more based on a total weight of the organic dispersion medium, and the oxirane compound being present in an amount of 30% or less based on a total weight of the organic dispersion medium:

$$R^{11}\text{—}R^{12}\text{—}(R^{11})_p \tag{1}$$

wherein, $R^{11}$ is selected from the group consisting of a vinyl ether group, an atomic group having a vinyl ether group, an alkoxy group, an ether group and a hydroxyl group, at least one of the $R^{11}$s being a vinyl ether group or an atomic group having a vinyl ether group; $R^{12}$ is a (p+1)-valent group having a substituted or unsubstituted cyclic skeleton containing an oxygen atom as a ring-constituting atom; and p is a positive integer including zero.

2. The photosensitive inkjet ink according to claim 1, wherein a monofunctional compound is present and contained at a concentration of 30-50% based on a total weight of the organic dispersion medium.

3. The photosensitive inkjet ink according to claim 1, wherein said oxetane compound is present in an amount of 20 to 60% by weight based on a total weight of the organic dispersion medium.

4. The photosensitive inkjet ink according to claim 1, wherein formula (1) has 2 to 3 $R^{11}$s.

5. The photosensitive inkjet ink according to claim 1, wherein the $R^{12}$ in formula (1) is selected from the group consisting of a group represented by formula (VE2-a) and a group represented by formula (VE2-b):

(VE2-a)

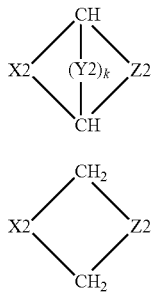

(VE2-b)

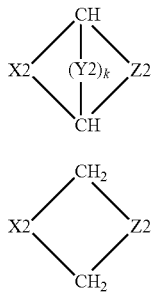

wherein X2 and Z2 are respectively an alkylene group having 1 to 5 carbon atoms or a bivalent organic group containing oxygen atom as ether linkage, Y2 is an oxygen atom, an alkylene group having 1 or 2 carbon atoms, or a bivalent organic group containing oxygen atom as ether linkage with a proviso that at least any one of X2, Y2 and Z2 contains at least one oxygen atom; and k is 0 or 1.

6. The photosensitive inkjet ink according to claim 5, wherein the vinyl ether compound is selected from the group consisting of:

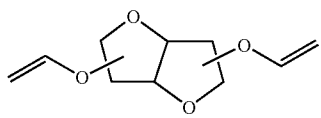

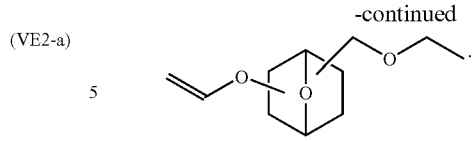

7. The photosensitive inkjet ink according to claim 1, wherein the oxirane compound comprises a monofunctional oxirane.

8. The photosensitive inkjet ink according to claim 1, which comprises a compound represented by

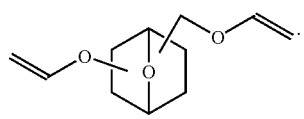

9. The photosensitive inkjet ink according to claim 1, which has a viscosity of 50 mPa·s or less at a temperature of 25° C.

10. A printed material comprising:
a cured material formed through the curing of the photosensitive inkjet ink claimed in claim 1.

\* \* \* \* \*